United States Patent
Rojas Sanchez et al.

(10) Patent No.: US 8,128,024 B2
(45) Date of Patent: Mar. 6, 2012

(54) STRUCTURE OF A PNEUMATIC INSTALLATION IN A TAIL ZONE OF AN AIRCRAFT

(75) Inventors: David Rojas Sanchez, Madrid (ES); José Carvajal Cornejo, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 570 days.

(21) Appl. No.: 12/232,731

(22) Filed: Sep. 23, 2008

(65) Prior Publication Data

US 2009/0294581 A1   Dec. 3, 2009

(30) Foreign Application Priority Data

May 30, 2008   (ES) .................................. 200801625

(51) Int. Cl.
    *B64D 41/00*    (2006.01)
(52) U.S. Cl. ......... 244/58; 244/118.5; 60/39.12; 60/785
(58) Field of Classification Search .................... 244/58, 244/118.5; 60/39.12, 787, 785

See application file for complete search history.

(56) References Cited

U.S. PATENT DOCUMENTS

| | | | |
|---|---|---|---|
| 4,706,908 A * | 11/1987 | Huffman et al. | 244/118.5 |
| 6,296,957 B1 * | 10/2001 | Graage | 429/425 |
| 7,380,749 B2 * | 6/2008 | Fucke et al. | 244/58 |
| 2005/0103931 A1 * | 5/2005 | Morris et al. | 244/58 |

* cited by examiner

*Primary Examiner* — J. Woodrow Eldred
(74) *Attorney, Agent, or Firm* — Wenderoth, Lind & Ponack, L.L.P.

(57) ABSTRACT

A structure of a pneumatic installation in a tail zone of an aircraft includes an auxiliary power unit (1) for supply of pneumatic and electrical power, whose pneumatic power outlet is linked to a duct (2) which conventionally incorporates bends (7) and compensation elements (6) for thermal expansion and for compensation of the vibrations produced by the APU (1) in its functioning. The power outlet of the APU (1) is arranged in its front part in which is connected the duct consisting of a straight pipe (2a) inclined downwards toward the lower part of the aircraft in which compensation elements (6) for thermal expansion and for compensation of vibrations are inserted in order to reduce the length of the duct (2) and eliminate the bends, so that the pressure losses are considerably reduced.

3 Claims, 2 Drawing Sheets

STRUCTURE OF A PNEUMATIC INSTALLATION IN A TAIL ZONE OF AN AIRCRAFT

OBJECT OF THE INVENTION

As stated in the title of the present description, the present invention relates to the structure of the pneumatic installation in the tail zone of an aircraft; which has the object of providing a novel structure that permits reduction in the length of the duct of the pneumatic installation and elimination of the bends presented by said duct in the tail zone of an aircraft, in such a way that the new installation has lower cost, less weight and lower pressure losses in the duct.

In general, the invention is applicable in any type of passenger aircraft, and more specifically it comes within the development of the new generation of dual-aisle, long-haul aircraft that are equipped with more systems that are in turn more complex, and therefore demand greater energy for functioning.

PRIOR ART OF THE INVENTION

Aircraft including a pneumatic installation, which comprises an auxiliary power unit (APU) defined by an auxiliary engine in charge of starting up the main engines of the aircraft, along with supplying electrical and pneumatic energy for the aircraft systems while the main engines are switched off are known. The joint use of the APU with the main engines when an extra input of power is required is also already considered.

This engine is traditionally housed in the rear tail cone of the aircraft. Its functioning is that of a jet engine, though of smaller size than the main engines. It therefore obtains electrical energy by means of a generator driven by the actual engine shaft, and it obtains mechanical energy by means of bleeding of air from the first compression stages which circulates through it and which is absorbed from outside of the aircraft.

The demand for electrical energy in the aircraft systems, including on the ground, when the main engines are switched off, is becoming ever greater. Therefore, the power which the APU can supply is becoming more and more compromised. Consequently, the less power the APU has to devote to supplying pneumatic energy, the greater the amount of energy it will be able to devote to electrical power.

There is a high percentage of pressure being consumed as losses in the pneumatic duct conveying air from the APU to the systems demanding it. These losses mostly take place in the bends included in the duct, and, the closer they are to the supply source (the APU), the greater the losses they produce, since there is an exponential relation between losses and pressure, the greater the pressure the greater is the pressure drop due to a bend and to friction. Consequently, the closer the bends are to the APU, the more prejudicial they are for the overall functioning of the system.

Moreover, the pneumatic duct incorporates elements that compensate for the movement which the duct might undergo, this movement being more critical the closer they are to the APU, since, as it is concerned to an engine, its vibrations are transmitted to the duct, especially under transitory regimes or during malfunctioning. It is therefore necessary to compensate the movements of the APU so that they are not transmitted to the duct, which could lead to faults or breakage due to fatigue.

The design of the pneumatic installation in the tail zone of an aircraft is, therefore, particularly delicate since it is there where the APU is arranged.

The traditional way of tackling this compensation for the movements of the APU is by means of three bends provided in the duct, which permit the thermal expansions to be compensated for, and three compensating elements, normally cardan joints, which absorb angular movements.

This configuration has the drawback that a large amount of losses are introduced by having the three bends close to the APU, which also means that the duct has extra length precisely in the zone that is most sensitive to pressure losses.

Furthermore, it involves the additional problem of the duct that extends upward from the front side part of the APU, toward the top part of the aircraft. And all along the pressured zone where the passengers are to be found, therefore the pneumatic duct has to run beneath the passenger cabin, which means that it has to reach the lowest part of the aircraft before it arrives to the pressurized sections.

Moreover, it can be pointed out that there exists an important obstacle between the APU and the pressurized zone determined by the HTP (Horizontal Tail Plane—i.e. the horizontal stabilizer of the aircraft) which occupies the entire volume of the aircraft from one side to the other, allowing free passage solely above or below it. The usual thing, therefore, is that the pneumatic duct passes above the stabilizer and, once this obstacle has been overcome, it then descends to the lower part of the aircraft.

There also exists the impediment of the union frames of the fuselage of the aircraft between the sections containing the APU and those containing the stabilizer. This union frame is of the latticework type having a central opening and leaving defined gaps (hollows) via which the pneumatic duct can pass. Given the fact that the frame is located prior to reaching the horizontal stabilizer, this reduces even more the length in which compensation for the movements has to be carried out from the outlet of the APU, and it justifies even more the fact that the pneumatic duct passes above the horizontal stabilizer, thus the length of the pneumatic duct necessary to reach the lower part of the aircraft can be reduced before crossing the HTP.

Additionally, is to be added the fact that this zone supports the weight of the vertical stabilizer, therefore the upper part of the frames has a larger cross-section than the lower part in order to support said weight.

All this determines that, frequently, holes have to be made in the structural frames of the fuselage of the aircraft in this zone, with the difficulties and drawbacks that this implies, since these frames are made of a metallic and carbon fiber material, and the use of fiber makes it difficult to drill holes, holes that have to be large in order to permit the passage of the pneumatic duct. This represents a major problem since these zones are structurally loaded, which considerably complicates the design of the frames, leading to an increase in weight.

Additionally to what has already been explained, the design of the duct above the horizontal stabilizer has a longer travel in comparison to a design running beneath it, which leads to the system itself generating further pressure losses and an increase in the weight of the duct.

DESCRIPTION OF THE INVENTION

In order to achieve the objectives and solve the drawbacks stated above, the invention has developed a configuration for the pneumatic installation in the tail zone of an aircraft which, as with conventional ones, is endowed with an auxiliary power unit (APU) for the supply of pneumatic and electrical power, whose pneumatic power outlet is linked to a duct which, prior to arriving at the pressurized passenger cabin zone, is located in the lower part of the aircraft; this duct having compensation elements for thermal expansion and for compensation of the vibrations produced by the APU in its functioning. The novelty of the invention lies in the fact that the power outlet of the APU is arranged downward and in its front part in which is connected the duct consisting of a straight pipe inclined and descending down towards the lower part of the aircraft. Moreover, inserted in that pipe are the compensation elements for thermal expansion and for compensation of the vibrations produced by the APU, such that by means of this structure the length of the pneumatic duct is considerably reduced and the bends conventionally incorporated into it are eliminated.

This novel configuration has the great advantage that pressure losses are considerably reduced by avoiding bends in such a critical zone and by reducing the length of the duct, and therefore the friction. It is also less complex due to the reduction in the number of elements needed in the installation, and at the same time the weight and cost of the installation are reduced. Also, it allows the low zone of the aircraft to be reached directly, immediately on exiting the APU, which means that the pipe passes through the lower part of the horizontal stabilizer via the space between the stabilizer and the lower part of the frames, because the lower section of the frames is much less in its lower part than in the upper part, as stated previously, which avoids the necessity of making holes in the frames and reduces the length of the duct and increases the space available for installing and maintaining it.

In addition, greater space is achieved in the adjacent zone of the APU since the volume occupied by the duct in this zone is far less, which helps in maintenance of the APU and of its adjacent zones.

Following, in order to facilitate a better understanding of this specification and forming an integral part thereof, a series of figures are attached in which, on an illustrative rather than limiting basis, the most characteristic details of the object of the invention have been represented.

DESCRIPTION OF THE PREFERRED FORM OF EMBODIMENT

Given below is a description of the invention based on the figures commented upon above.

Figure 1:
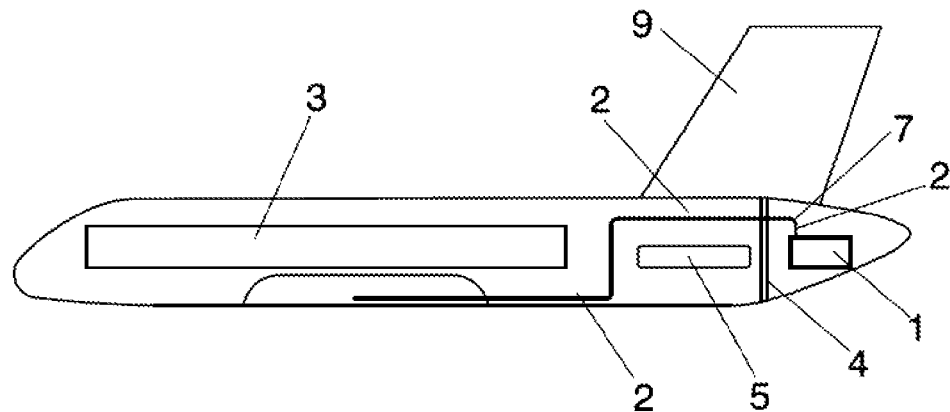
FIG. 1.—Shows a schematic lateral view of an aircraft in which a conventional structure of the air conditioning pneumatic installation has been included.
Figure 2:
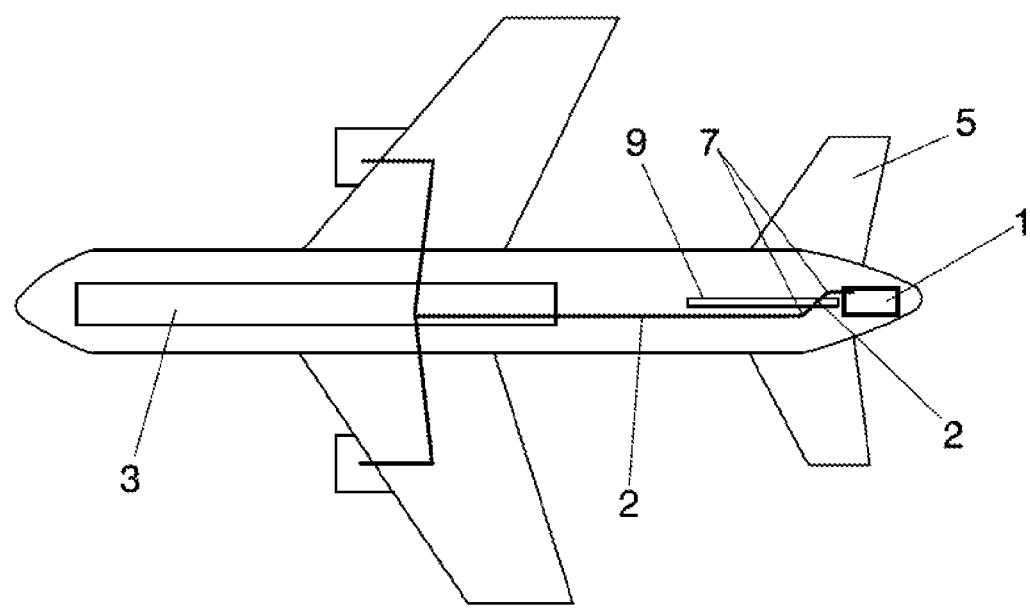
FIG. 2.—Shows a plan view of the above figure.
Figure 3:
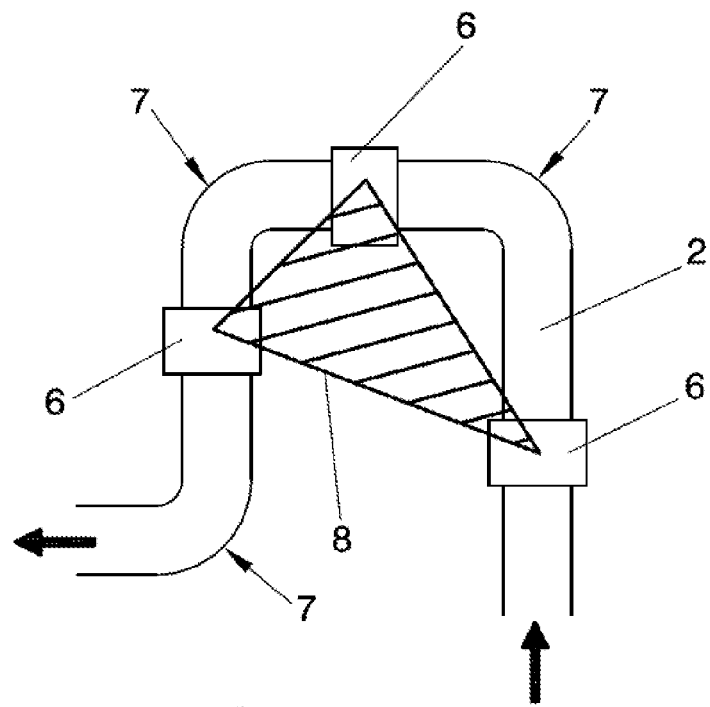
FIG. 3.—Shows a conventional schematic view of the zone of the duct exiting from the APU.
Figure 4:
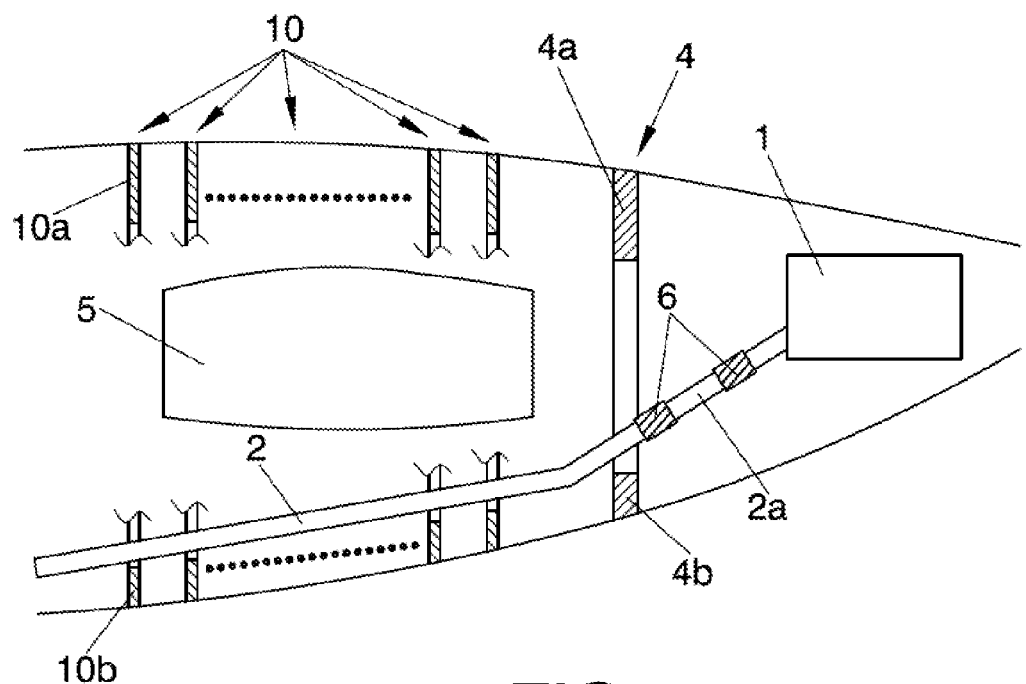
FIG. 4.—Shows a schematic representation of a possible embodiment of the inventive structure.

First of all, and in order to facilitate an understanding of the invention, a conventional structure of the pneumatic installation in the tail zone of an aircraft is described with the aid of FIGS. 1 to 3, in order to complement and facilitate the understanding of the section on prior art of the invention.

As it was described in the prior art section of the present description, pneumatic facilities in the tail zone of an aircraft consist of an APU 1, the upper part of which has an air outlet to which is connected a duct 2 which initially runs along the upper part of the aircraft, and which has to be located in the lowest part of the aircraft before reaching the pressurized passenger cabin 3. The situation occurs that close to the APU 1 is a strengthening frame 4 for joining the section of the APU and the section of the HTP. The other frames 10 of the HTP are formed with a wider cross section in the upper part 10a than in the lower part 10b, in order to conveniently absorb the loading distribution generated on the vertical tail plane 10.

Moreover, the duct 2 has a considerable diameter, so there is little space for permitting the duct 2 to descend to the lower part of the aircraft, which means that in most cases in the state of the art the duct 2 runs along the upper part of the aircraft passing above the horizontal stabilizer 5. To achieve this, some holes have to be made in the upper section 4a of the frame 4 so that the duct 2 can be allowed to pass.

This configuration leads to a great length of duct 2 and the incorporation of bends 4, which lead to a considerable loss of pressure, as it was mentioned before.

Moreover, the vibrations which the APU 1 transmits to the duct 2 need to be compensated for, and this compensation is done by means of compensation elements 6 for the vibrations produced by the APU in its functioning and by means of the actual bends 7 required in the installation, which also carry out compensation of thermal expansions such that the angular movements produced by the APU are absorbed and the duct 2 is preserved from suffering fatigue and stresses affecting its working life.

The traditional way of tackling these compensations for the movements of the APU is by means of three bends 7 as shown in FIG. 3, which do not have to lie in the same plane, and by means of the incorporation of three compensating elements 6, normally consisting of cardan joints.

The larger the area 8 of the triangle formed by the compensating elements 6 is, the greater the capacity to absorb movements in the duct 2 is.

The problem this solution involves, although simple and effective from the point of view of compensating for movements, is the amount of pressure losses that it introduces into the system since it is achieved by means of bends 7 and extra length, precisely in the zone which is most sensitive to these losses.

In order to resolve these drawbacks, the present invention has developed a configuration of the pneumatic installation wherein the air compressed outlet of the APU 1 is arranged in the front part of the APU 1 and downwards the aircraft. Therefore it is necessary to redesign the APU 1, in such a way that the duct which is connected to it consist of a straight pipe 2a inclined down towards the down part of the aircraft in such a way that it reaches the frame 4 via its lower part, which means that the duct 2 can pass through the lower part of the other frames 10, in other words on the upper edge of the lower section 10b of the frames 10, since the lower section 10b is much smaller than the upper section 10a, as was stated. Therefore, the new arrangement of the invention does not affect the structure of the aircraft and permits passage through the lower part of the tail plane 5 without having to incorporate bends 7.

Inserted in the pipe 2a there are compensation elements 6 for thermal expansion and for compensation of the vibrations in order to preserve the pipe 2a from breakages due to fatigue.

The invention claimed is:

1. A structure of a pneumatic installation in a tail zone of an aircraft, the pneumatic installation comprising a duct, compensation elements and an auxiliary power unit (APU) for supply of pneumatic and electrical power, said auxiliary power unit in turn comprising a pneumatic power outlet, which is arranged in a front part of said auxiliary power unit, is linked to the duct which, before it reaches a zone of the pressurized passenger cabin, is located in a lower part of the aircraft, said duct comprising a straight pipe (2a) inclined downwards toward the lower part of the aircraft, and further comprising two compensation elements inserted in said straight pipe for thermal expansion and for compensation of vibrations produced by the auxiliary power unit.

2. The structure of claim 1, wherein the pipe passes through a lower part of a horizontal stabilizer.

3. The structure of claim 1, wherein the pipe passes through a lower part of an opening conventionally provided through strengthening frames without affecting their structure.

* * * * *